US009653042B2

(12) United States Patent
Miura et al.

(10) Patent No.: US 9,653,042 B2
(45) Date of Patent: May 16, 2017

(54) TRAVEL PATH ANALYSIS SUPPORT DEVICE AND METHOD

(71) Applicant: FUJITSU LIMITED, Kawasaki-shi, Kanagawa (JP)

(72) Inventors: Yoshiko Miura, Narashino (JP); Norio Hiraga, Ota (JP); Takashi Shimada, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/167,355

(22) Filed: May 27, 2016

(65) Prior Publication Data

US 2016/0351162 A1 Dec. 1, 2016

(30) Foreign Application Priority Data

May 28, 2015 (JP) ................. 2015-108892

(51) Int. Cl.
| | | |
|---|---|---|
| *G09G 5/02* | (2006.01) | |
| *G06F 19/00* | (2011.01) | |
| *G06G 7/70* | (2006.01) | |
| *G06G 7/76* | (2006.01) | |
| *G08G 1/00* | (2006.01) | |

(Continued)

(52) U.S. Cl.
CPC ........... *G09G 5/02* (2013.01); *G06K 9/00335* (2013.01); *G06K 9/00785* (2013.01); *G06T 3/40* (2013.01); *G06T 7/20* (2013.01); *G06T 7/90* (2017.01); *G08G 1/065* (2013.01); *G09G 5/14* (2013.01); *G06T 2207/20021* (2013.01); *G06T 2207/30236* (2013.01); *G06T 2207/30242* (2013.01); *G06T 2207/30252* (2013.01);

(Continued)

(58) Field of Classification Search
None
See application file for complete search history.

(56) References Cited

U.S. PATENT DOCUMENTS

| | | | | |
|---|---|---|---|---|
| 8,972,080 B2* | 3/2015 | Shida | ................. | G08G 1/0104 701/117 |
| 9,188,452 B2* | 11/2015 | Fuchs | ................ | G01C 21/3492 |

(Continued)

FOREIGN PATENT DOCUMENTS

| | | |
|---|---|---|
| JP | 10-283588 A | 10/1998 |
| JP | 2001-155292 A | 6/2001 |

*Primary Examiner* — Martin Mushambo
(74) *Attorney, Agent, or Firm* — Westerman, Hattori, Daniels & Adrian, LLP

(57) ABSTRACT

A travel path analysis support device includes a processor that executes a procedure. The procedure includes: performing, in accordance with a selected first display color control, change control of display colors of respective regions obtained by mesh-dividing within the geographic region according to a time-wise change in a number of vehicles that pass through the respective regions; when an instruction for enlarged display of a partial region inside the geographic region is received at as given timing of a procedure by which display colors of the respective regions are changed by the change control, displaying the partial region enlarged, and selecting a second display color control based on a total number of vehicles that have entered the partial region within the time range since the given timing; and performing, in accordance with the selected second display color control, change control of the display colors of the respective regions.

9 Claims, 11 Drawing Sheets

| TOTAL NUMBER OF VEHICLES | CUMULATIVE NUMBER OF VEHICLES | DISPLAY COLOR |
|---|---|---|
| ... | | |
| 10000 | 1001 OR MORE | RED |
|  | 501 TO 1000 | BLUE |
|  | 101 TO 500 | GREEN |
|  | 21 TO 100 | PALE GREEN |
|  | UP TO 20 | GREY |
| 5000 | ... | |
| 2000 | ... | |
| 1000 | 501 OR MORE | RED |
|  | 101 TO 500 | BLUE |
|  | 51 TO 100 | GREEN |
|  | 21 TO 50 | PALE GREEN |
|  | UP TO 20 | GREY |
| ... | | |

(51) Int. Cl.
*G06K 9/00* (2006.01)
*G06T 7/20* (2017.01)
*G06T 3/40* (2006.01)
*G09G 5/14* (2006.01)
*G08G 1/065* (2006.01)
*G06T 7/90* (2017.01)

(52) U.S. Cl.
CPC ............... *G09G 2320/0666* (2013.01); *G09G 2340/045* (2013.01); *G09G 2380/10* (2013.01)

(56) References Cited

U.S. PATENT DOCUMENTS

| | | | |
|---|---|---|---|
| 9,443,424 B2 * | 9/2016 | Koshizen | ............... B60K 37/02 |
| 2010/0082227 A1 * | 4/2010 | Posner | ............. G08G 1/096775 |
| | | | 701/118 |

* cited by examiner

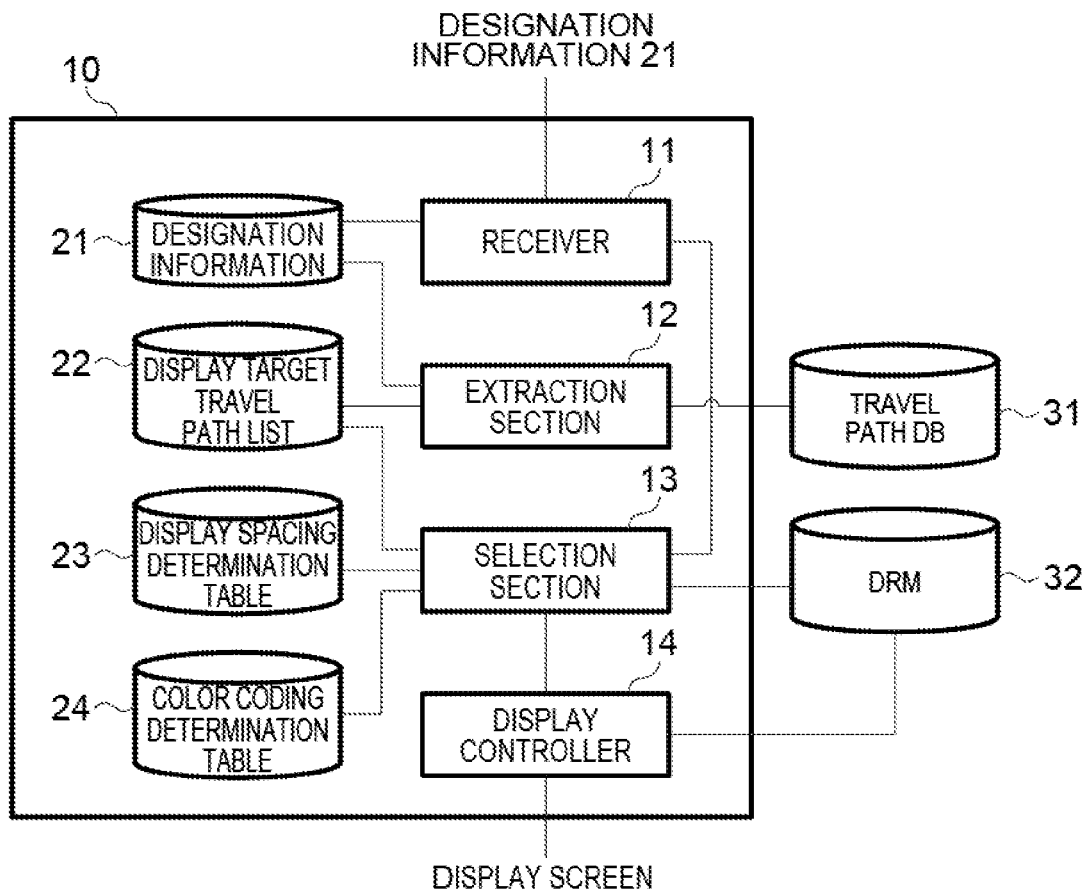

| DISPLAY SCALE | MESH QUADRANGLE SPACING | SELECTION ORDER |
|---|---|---|
| ... | | |
| 10km | 1km | 1 |
| 5km | 0.5km | 2 |
| 2km | 0.2km | 3 |
| 1km | 0.1km | 4 |
| ... | | |

FIG. 6
| TOTAL NUMBER OF VEHICLES | CUMULATIVE NUMBER OF VEHICLES | DISPLAY COLOR |
|---|---|---|
| ... | | |
| 10000 | 1001 OR MORE | RED |
| | 501 TO 1000 | BLUE |
| | 101 TO 500 | GREEN |
| | 21 TO 100 | PALE GREEN |
| | UP TO 20 | GREY |
| 5000 | ... | |
| 2000 | ... | |
| 1000 | 501 OR MORE | RED |
| | 101 TO 500 | BLUE |
| | 51 TO 100 | GREEN |
| | 21 TO 50 | PALE GREEN |
| | UP TO 20 | GREY |
| ... | | |
FIG. 7
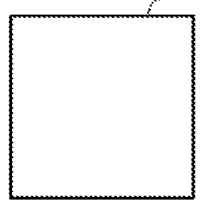 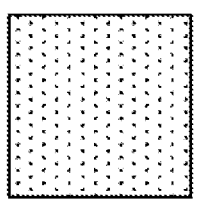 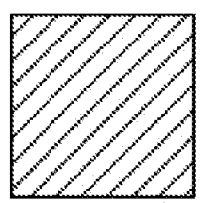 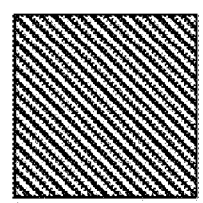 
UP TO 20　　21 TO 100　　101 TO 500　　501 TO 1000　　1001 OR MORE
GREY　　PALE GREEN　　GREEN　　BLUE　　RED

TRAVEL PATH ANALYSIS SUPPORT DEVICE AND METHOD

CROSS-REFERENCE TO RELATED APPLICATION

This application is based upon and claims the benefit of priority of the prior Japanese Patent Application No. 2015-108892, filed on May 28, 2015, the entire contents of which are incorporated herein by reference.

FIELD

The embodiments discussed herein are related to a storage medium storing as travel path analysis support program, a travel path analysis support device, and a travel path analysis support method.

BACKGROUND

Conventional technology exists for displaying a traffic condition so that the traffic condition can be understood visually.

For example, technology has been proposed in which traffic condition evaluations from respective observation points based on vehicle speed and the number of passing vehicles are displayed as marks at positions corresponding to the actual observation points on a road map. In such technology, the displayed marks are displayed with display attributes (color and blinking) that accord with the traffic condition evaluations of the corresponding observation points.

Moreover, technology has been proposed in which map data read from a map data storage unit is, for example, divided by plural meshes, and for each mesh, evaluation values indicating an extent of congestion on roads are computed and the roads are displayed with color coding.

RELATED PATENT DOCUMENTS

Japanese Laid-Open Patent Publication No. 2001-155292
Japanese Laid-Open Patent Publication No. H10-283588

SUMMARY

According to an aspect of the embodiments, a non-transitory recording medium stores a travel path analysis support program that causes a computer to execute a process. The process includes: receiving a designation of a geographic region and a time range; selecting a first display color control from plural display color controls according to a total number of vehicles that have entered the geographic region within the time range; performing, in accordance with the selected first display color control, change control of display colors of respective regions, which are obtained by mesh-dividing within the geographic region, according to a time-wise change in a number of vehicles that pass through the respective regions; when an instruction for enlarged or reduced display of a partial region inside the geographic region is received at a given timing of a procedure by which the display colors of the respective regions are changed by the change control, displaying the partial region enlarged or reduced, and selecting a second display color control from the plural display color controls based on a total number of vehicles that have entered the partial region within the time range after and including the given timing; and performing, in accordance with the selected second display color control, change control of the display colors of respective regions included in the partial region, according to a time-wise change in the number of vehicles passing through the respective regions.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a functional block diagram illustrating a schematic configuration of a travel path analysis support device;

FIG. 2 is a diagram illustrating an example of a travel path database (DB);

FIG. 3 is a diagram illustrating an example of designation information;

FIG. 6 is a diagram illustrating an example of a color coding determination table;

FIG. 7 is a diagram for explaining selection of display colors of a mesh square;

DESCRIPTION OF EMBODIMENTS

Figures 4, 5:
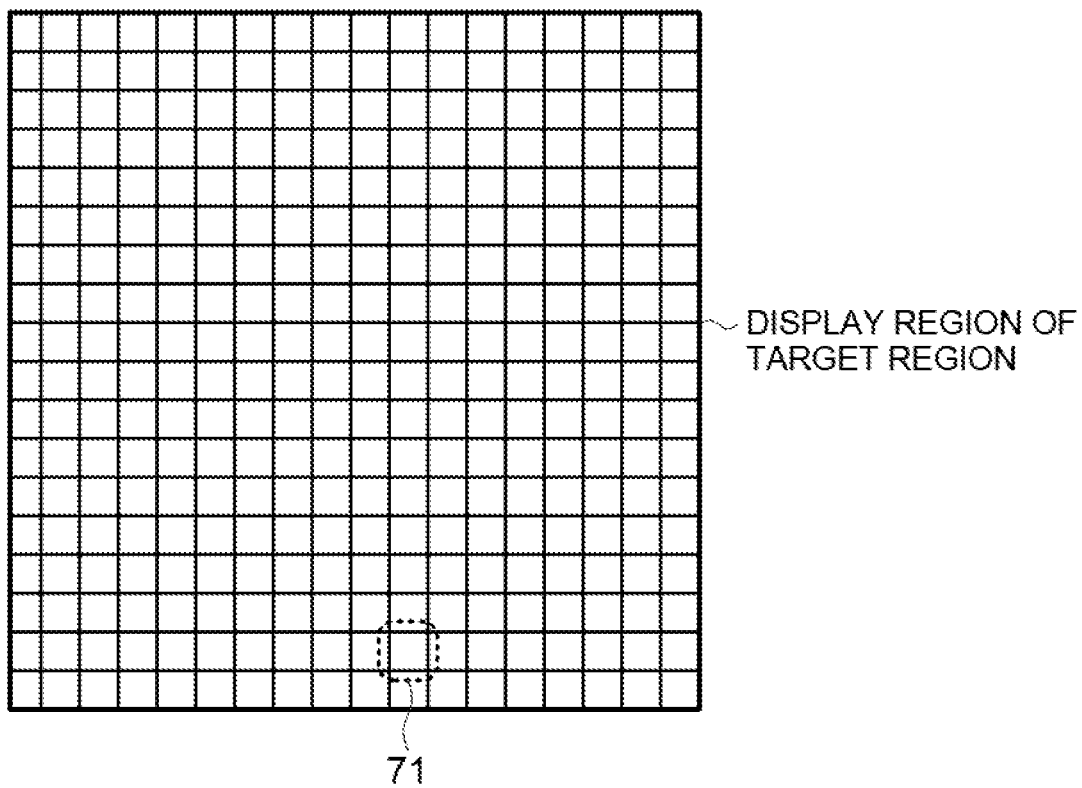
FIG. 4 is a diagram for explaining a mesh square.
FIG. 5 is a diagram illustrating an example of a display spacing determination table.

Detailed explanation follows regarding an exemplary embodiment related to technology disclosed herein, with reference to the drawings. In the present exemplary embodiment, explanation is given regarding a case in which time-wise changes in cumulative numbers of vehicles that passed through respective positions of specific regions are displayed by color coding corresponding positions on a road map.

As illustrated in FIG. 1, a travel path analysis support device 10 according to the present exemplary embodiment includes a receiver 11, an extraction section 12, a selection section 13, and a display controller 14. The travel path analysis support device 10 reads information of a travel path database (DB) 31 and a digital road map (DRM) 32 stored in an external storage device. The travel path DB 31 and the DRM 32 are not limited to being stored in an external storage device, and may be stored on an internal disk of the travel path analysis support device 10, or in portable memory such as USB memory.

The DRM 32 includes information that represents a road network as nodes and links. Nodes indicate nodal points expressing a road network, such as junctions, interchanges, and intersections, and links indicate road segments between nodes. Respective distinct identification numbers (node numbers and link numbers) are allocated to the nodes and links. The DRM 32 also includes information regarding latitudes and longitudes indicating positions of nodes and links on the road map, and information regarding the names of junctions, interchanges, intersections, and the like, corresponding to the respective nodes. The road map included in the DRM 32 is managed in two-dimensional mesh units obtained by segmenting the total region included in the DRM 32 into specific ranges (for example, 10 km squares), and each two-dimensional mesh unit is allocated a two-dimensional mesh number. In addition, the DRM 32 includes information contained in ordinary digital road maps.

The travel path DB 31 stores travel path information regarding travel paths of respective vehicles. The travel path information is obtained by, for example, processing positioning information that includes position information (latitude and longitude) of positioning of a vehicle measured at specific positioning intervals by a global positioning system (GPS) installed in the vehicle, a positioning timing, and identification information of the vehicle a vehicle ID).

Explanation follows regarding an example of processing performed to obtain travel path information by processing positioning information. Here, explanation is given regarding a case in which an information processing device (omitted from illustration in the drawings) acquires the positioning information, and the acquired positioning information is converted into travel path information. The information processing device groups the positioning information by vehicle ID, and generates a positioning information series by ordering the grouped positioning information by positioning timing. Based on the position information and the positioning timing included in each item of positioning information, the information processing device detects places in the positioning information series indicating a vehicle stopping for a specific time (for example, 5 minutes) or greater, and splits the positioning information series at the detected places. The information processing device regards each positioning information series obtained by splitting as a single trip (a travel path sequence), assigns an identification number (a trip number) to each trip, and allocates the trip number to each item of positioning information included in that same trip.

Moreover, the information processing device corresponds positions indicated by the position information (latitudes and longitudes) included in the positioning information with the DRM 32, and corrects the latitudes and longitudes such that the corresponding positions are positions where vehicles may exist, such as roads. The information processing device also acquires the two-dimensional mesh numbers of the two-dimensional mesh units of the DRM 32 that include positions indicated by the corrected latitudes and longitudes.

The information processing device stores information included in the positioning information, and information acquired by the above processing, in, for example, a travel path DB 31 like that illustrated in FIG. 2. In the example of the travel path DB 31 illustrated in FIG. 2, each row (each record) corresponds to one item of travel path information. Each item of travel path information includes as "vehicle ID" item, a "trip number" item, a "two-dimensional mesh number" item, a "time unit start date and time" item, a "latitude" item, and a "longitude" item. Each item thereof stores corresponding information from out of the information included in the positioning information and the information acquired by the above processing.

Note that the "time unit start date and time" is a date and time indicating the start time point for each time unit (for example, 1 second) of animation display processing, described below. In cases in which the positioning intervals at which the position of a vehicle is measured is set at the time unit, the positioning timing may be employed as the "time unit start date and time". Note that the time unit may be made longer than the positioning interval, and the acquired positioning information may be thinned out and corresponded with the time unit intervals, and converted into travel path information.

Designation information 21 designated by the user is input to the travel path analysis support device 10. Designation of the designation information 21 by the user may be performed by the user operating an input device (omitted from illustration in the drawings).

The designation information 21 is information designating a display target range for the animation display, described below. The designation information 21 includes information that designates a target region (a geographical region), and a target period (a time range), as the display target range. FIG. 3 illustrates an example which a two-dimensional mesh number in the DRM 32 is designated as the target region by a "location" item. Plural two-dimensional mesh numbers may be designated. Note that designation of a target region is not limited to cases in which a two-dimensional mesh number is designated, and another method of designation, such as designating by latitude and longitude, may be employed. An example is illustrated in which a target period is designated by a "start date and time" item and an "end date and time" item that indicate date and times for the start and end of that target period.

The receiver 11 receives the designation information 21 input to the travel path analysis support device 10, and stores the received designation information 21 in a specific storage region.

The receiver 11 also receives instructions, input by the user, for enlarged display of the animation display in the display. Input of enlarged display by the user may, for example, be performed by double clicking on a place the user wants displayed enlarged. When the receiver 11 receives instructions for enlarged display, the selection section 13 is notified of the instruction for enlarged display together with a coordinate position where the instruction for enlarged display was made, and a time unit start date and time corresponding to an image frame of the animation display that was being displayed when the instruction for enlarged display was made. The time unit start date and time corresponding to the image frame of the animation display that was being displayed when the instruction for enlarged display was made is referred to below as the "acknowledgement date and time".

The extraction section 12 references the designation information 21, and extracts travel path information corresponding to the target region and target period designated by the designation information 21 from out of the travel path information stored in the travel path DB 31 read from the external storage device. More specifically, the extraction section 12 extracts travel path information having a "two-dimensional mesh number" matching any of the two-dimensional mesh numbers designated by the "location" of the designation information 21 from the travel path DB 31. The extraction section 12 then extracts travel path information having a "time unit start date and time" that is included in the target period designated by the "start date and time" and "end date and time" of the designation information 21, from out of the extracted travel path information.

The extraction section 12 registers the final extracted travel path information in a display target travel path list 22. The data structure of the display target travel path list 22 is similar to the data structure of the travel path DB 31 illustrated in FIG. 2.

Based on the display target travel path list 22, the selection section 13 selects a display color for use in color coded display of each mesh quadrangle according to the cumulative number of vehicles in each mesh quadrangle by time unit (described in detail below).

More specifically, as illustrated in FIG. 21, the selection section 13 partitions the display region when the target region was displayed on screen into mesh quadrangles 71 of a specific size. A single mesh quadrangle 71 serves as the minimum unit of color coding of the display colors. Moreover, the range indicated by a single mesh quadrangle 71 differs according to the display scale when displaying the target region on screen. The display scale refers to the actual distance on the screen used to represent a specific length (for example, 1 cm). For example, as illustrated in FIG. 5, a display spacing determination table 23, in which the spacing of the mesh quadrangles 71 (horizontal width or vertical width) is determined for each display scale, is prepared in advance. The display spacing determination table 23 of the example of FIG. 5 also includes a "selection order" item. In the present exemplary embodiment, the display scale is changed in steps each time an instruction for enlarged display has been received by the receiver 11. The "selection order" determines the sequence in which the display scales are to be selected each time the instruction for enlarged display is received. Namely, in the example of FIG. 5, it is indicated that each time a double click is performed as an instruction for enlarged display, the display scale changes in the sequence of 10 km, 5 km, 2 km, 1 km.

The selection section 13 determines the display scale based on the display spacing determination table 23, determines the spacing of the mesh quadrangles 71 that corresponds to the display scale, and specifies the position information for each of the mesh quadrangles 71. The position information of a mesh quadrangle 71 may, for example, be specified by latitude and longitude indicating the position of the upper left corner of the mesh quadrangle 71.

The selection section 13 also selects the display color pattern when displaying each of the mesh quadrangles 71 with color coding, based on the total number of vehicles that have entered into the target region in the target period. The display color pattern is a collection of display colors corresponding to cumulative numbers of vehicles.

More specifically, as illustrated in FIG. 6, a color coding determination table 24 is prepared in advance, with the color coding determination table 24 determining plural display color patterns having granularities of cumulative numbers of vehicles, serving as standards for switching the display color, that vary depending on the total number of vehicles that have entered in the target region in the target period. The selection section 13 counts the vehicle IDs in the travel path information included in the display target travel path list 22, and finds the total number of vehicles that have entered the target region in the target period. Note that identical vehicle IDs are counted as 1. The selection section 13 references the color coding determination table 24, and determines the display color pattern based on the total number of vehicles counted.

The selection section 13 also tallies cumulative numbers of vehicles represented by the total of the number of vehicles that have passed through the range indicated by each of the mesh quadrangles 71, during each time unit from the start date and time of the target period up to a given time unit. More specifically, the selection section 13 counts travel path information in the display target travel path list 22 having a position indicated by the "latitude" and the "longitude" that is included in the ranges indicated by each of the mesh quadrangles 71, and having a "time unit start date and time" equal or prior to that of the given time unit. In accordance with the display color pattern determined based on the total number of vehicles, the selection section 13 determines the display color that corresponds to the number of items of travel path information counted, namely, the cumulative number of vehicles that passed through the range indicated by each of the mesh quadrangles 71 up until the given time unit. FIG. 7 illustrates examples of display colors of mesh quadrangles 71 corresponding to cumulative numbers of vehicles. FIG. 7 illustrates an example of a case in which, from out of the display color patterns illustrated in FIG. 6, the total number of vehicles is 10,000. In FIG. 7, color differences are represented by differences in the shading in a mesh quadrangle 71.

For each time unit in the target period, the selection section 13 determines the display color that corresponds to the cumulative number of vehicles that have passed through the range indicated by a mesh quadrangle 71, for all of the mesh quadrangles 71 included in the target region. The selection section 13 stores the determined display color in the specific storage region in association with the time unit and the position information of the mesh quadrangle 71.

Moreover, based on the instruction for enlarged display notified by the receiver 11, and based on the display target travel path list 22, the selection section 13 reselects the display color for color coded display of each of the mesh quadrangles 71 for each time unit, so as to correspond to display after enlargement.

More specifically, the selection section 13 references the display spacing determination table 23, and acquires the next display scale after the current display scale. In cases in which double clicking has been performed multiple times in succession, the display scale may be determined according to the number of double clicks, or the display scale may be directly selectable by user input.

The selection section 13 computes a region to be displayed after enlargement (an enlarged display region) based on the acquired display scale, and the latitude and longitude corresponding to the coordinate position notified by the receiver 11 together with the enlarged display notification.

Figure 8:
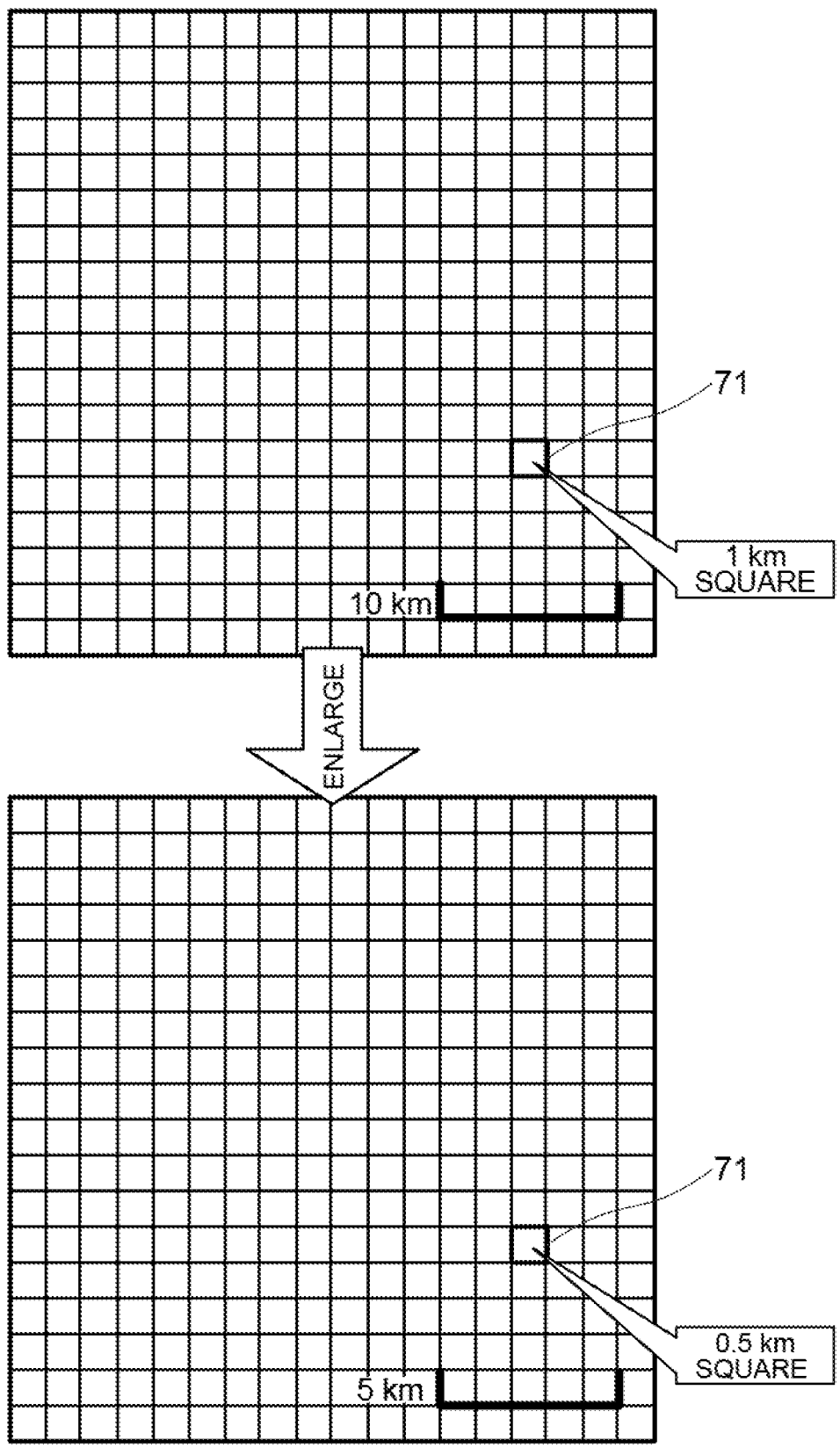
FIG. 8 is a diagram for explaining display spacings of a mesh square.

As illustrated in FIG. 8, in cases in which the display scale has been changed, a range indicated by a single mesh quadrangle 71 is also changed. The selection section 13 counts the total number of vehicles that have entered the enlarged display region, from the acknowledgement date and time acquired together with the notification for enlarged display from the receiver 11, until the end date and time of the target period. The selection section 13 then refers to the color coding determination table 24, and selects a display color pattern when each of the mesh quadrangles 71 are displayed with color coding, based on the total number of vehicles counted. The selection section 13 also specifies the range indicated by each of the mesh quadrangles 71 after the display scale has been changed, and counts the cumulative number of vehicles that have passed through the specified range in the target period. The selection section 13 then references the color coding determination table 24, and selects the display color according to the selected display color pattern and the counted cumulative number of vehicles.

For convenience of illustration, the sizes of the display scales and the mesh quadrangles 71 in FIG. 8 are illustrated with different ratios between the display scale determined by the display spacing determination table 23 illustrated in FIG. 5 and the mesh quadrangle spacing.

The selection section 13 selects the display colors for all of the mesh quadrangles 71 included in the enlarged display region for each time unit from the acknowledgement date and time until the end date and time of the target period. The selection section 13 stores in the specific storage region the selected display colors in association with the time unit and the position information of the mesh quadrangles 71. Moreover, the selection section 13 notifies the display controller 14 of the latitude and longitude for specifying the enlarged display region, and information indicating the display scale after enlargement.

The display controller 14 performs control such that each of the mesh quadrangles 71 corresponded with the road map indicated by the DRM 32 is displayed with the display color selected by the selection section 13. The display controller 14 implements the animation display by switching the display of the display colors of each of the mesh quadrangles 71 selected for each time unit, from moment to moment.

Figure 9:
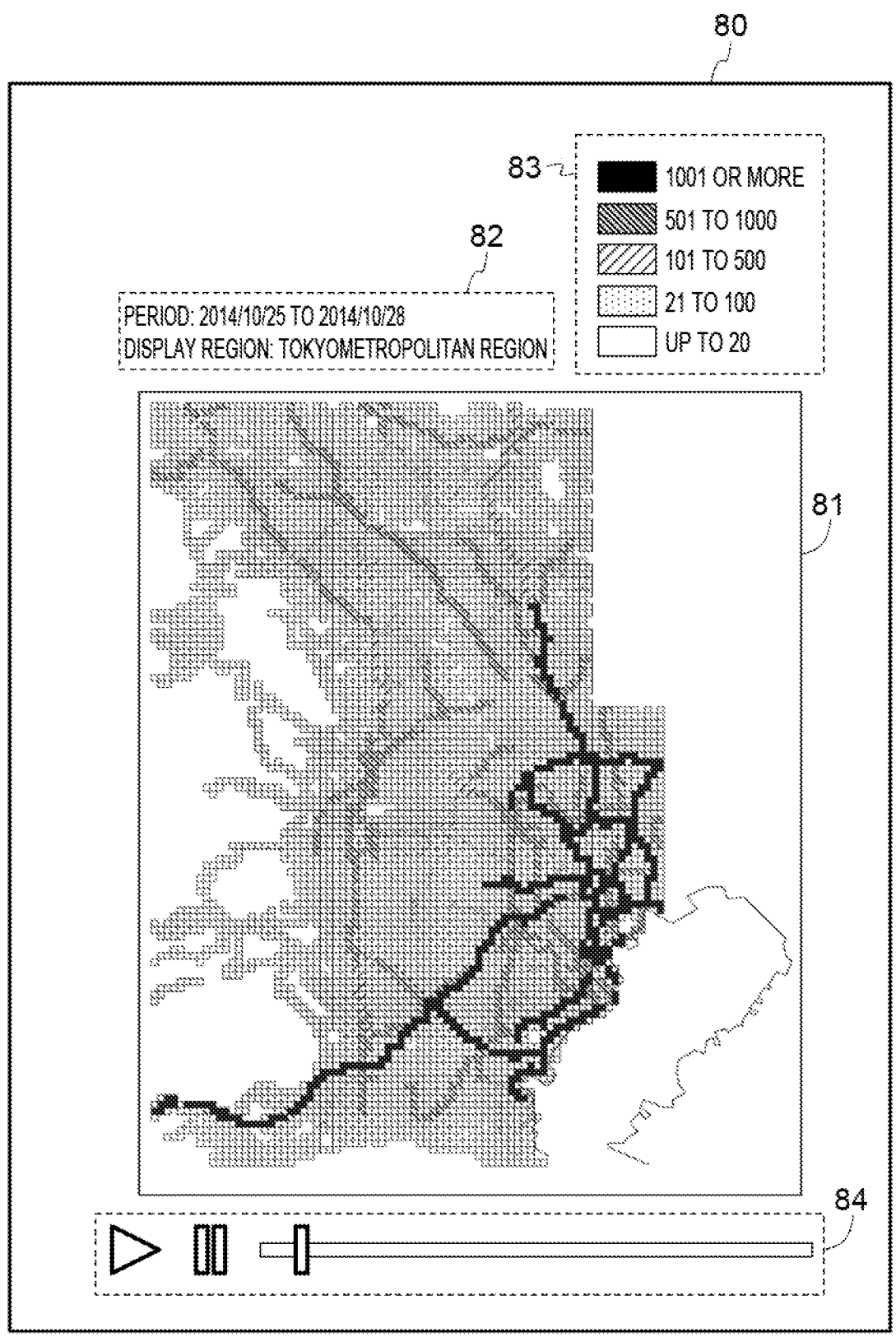
FIG. 9 is an illustrative diagram illustrating an example of a display screen.

More specifically, the display controller 14 performs control such that a display screen 80 like that illustrated in FIG. 9 is displayed on a display device (omitted from illustration in the drawings). In the example of FIG. 9, the display screen 80 includes an animation playback region 81 that plays back an animation, an information display region 82 that displays information such as the display target range, and a legend display region 83 that displays an explanatory legend for the color coding. Moreover, the display screen 80 includes a playback command bar 84 operated by a user when controlling playback of the animation. The playback command bar 84 may include, for example, a playback button, a pause button, and a slider bar for freely selecting a time unit (frame) to be displayed in the animation playback region 81.

More specifically, the display controller 14 specifies the time unit within the target period corresponding to the position of the slider bar included in the playback command bar 84. The display controller 14 acquires the display color selected for each of the mesh quadrangles 71 stored in association with the specified time unit. The display controller 14 also acquires information indicating nodes and links included in the target region from the DRM 32 and expands the road map onto the animation playback region 81. The display controller 14 then displays each of the mesh quadrangles 71 corresponding to the expanded road map with the acquired display color.

Moreover, in cases in which the playback button of the playback command bar 84 has been pressed, the display controller 14 changes the display colors of the mesh quadrangles 71 based the display colors selected for the next time unit each time a specific one frame worth of display time elapses. Accordingly, time-wise changes in the total number of vehicles for each of the mesh quadrangles 71 are displayed as an animation. The animation playback speed may be adjusted by configuring such that the display time for a single time unit (frame) can be changed freely.

Moreover, when the latitude and longitude for specifying the enlarged display region, and the information indicating the display scale after enlargement have been notified by the selection section 13, the display controller 14 acquires the display color selected for each of the mesh quadrangles 71 after enlarged display, from the specific storage region. Moreover, the display controller 14 acquires information indicating the nodes and the links included in the enlarged display region from the DRM 32, and expands the road map onto the animation playback region 81. The display controller 14 then displays each of the mesh quadrangles 71 corresponded with the expanded road map with the acquired display color.

Figure 10:
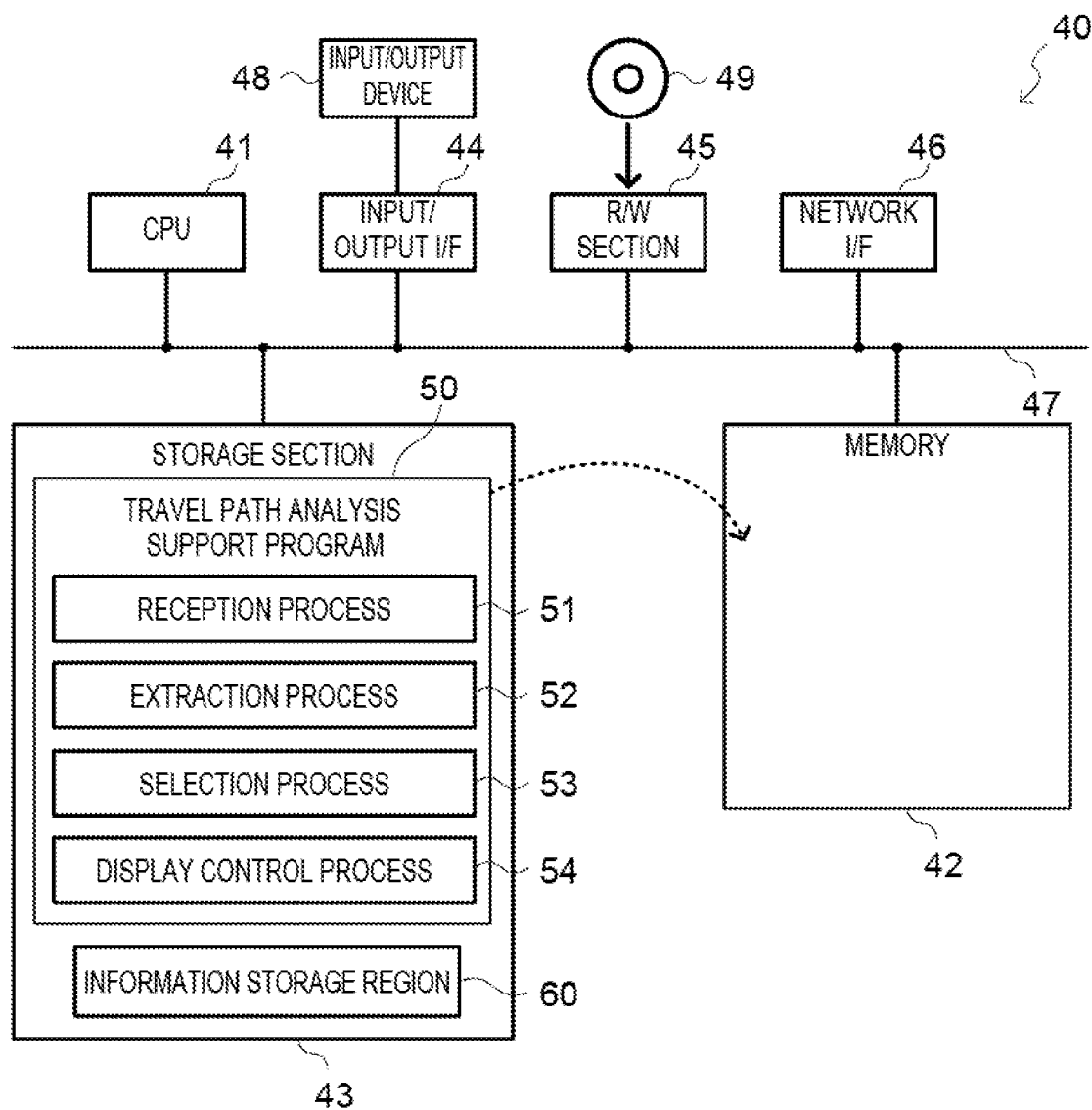
FIG. 10 is a block diagram illustrating a schematic configuration of a computer that functions as a travel path analysis support device.

The travel path analysis support device 10 can be implemented by for example, the computer 40 illustrated in FIG. 10. The computer 40 includes a CPU 41, a memory 42 serving as a temporary storage region, and a non-volatile storage section 43. The computer 40 further includes an input/output interface (I/F) 44 to which input/output devices 48, such as a display device and an input device, are connected. The computer 40 further includes a read/write (R/W) section 45 that controls reading and writing of data from and to a recording medium 49 and a network I/F 46 connected to a network such as the Internet. The CPU 41, the memory 42, the storage section 43, the input/output I/F 44, the R/W section 45, and the network I/F 46 are connected to one another through a bus 47.

The storage section 43 may be implemented by, for example, a hard disk drive (HDD), a solid state drive (SSD), or flash memory. A travel path analysis support program 50 for causing the computer 40 to function as the travel path analysis support device 10 is stored in the storage section 43, which serves as the storage medium. The storage section 43 also includes an information storage region 60 that stores the designation information 21, the travel path information that makes up the display target travel path list 22, the information that makes up the display spacing determination table 23, and the information that makes up the color coding determination table 24.

The CPU 41 reads the travel path analysis support program 50 from the storage section 43, expands the travel path analysis support program 50 into the memory 42, and sequentially executes the processes included in the travel path analysis support program 50. The CPU 41 also reads various types of information from the information storage region 60, and respectively expands the display target travel path list 22, the display spacing determination table 23, and the color coding determination table 24 into the memory 42.

The travel path analysis support program 50 includes a reception process 51, an extraction process 52, a selection process 53, and a display control process 54. The CPU 41 operates as the receiver 11 illustrated in FIG. 1 by executing the reception process 51. The CPU 41 also operates as the extraction section 12 illustrated in FIG. 1 by executing the extraction process 52. The CPU 41 also operates as the selection section 13 illustrated in FIG. 1 by executing the selection process 53. The CPU 41 also operates as the display controller 14 illustrated in FIG. 1 by executing the display control process 54. The computer 40, which executes the travel path analysis support program 50, thereby functions as the travel path analysis support device 10.

Note that functionality implemented by the travel path analysis support program 50 could also be implemented by, for example, a semiconductor integrated circuit, more specifically, by an application specific integrated circuit (ASIC).

Figure 11:
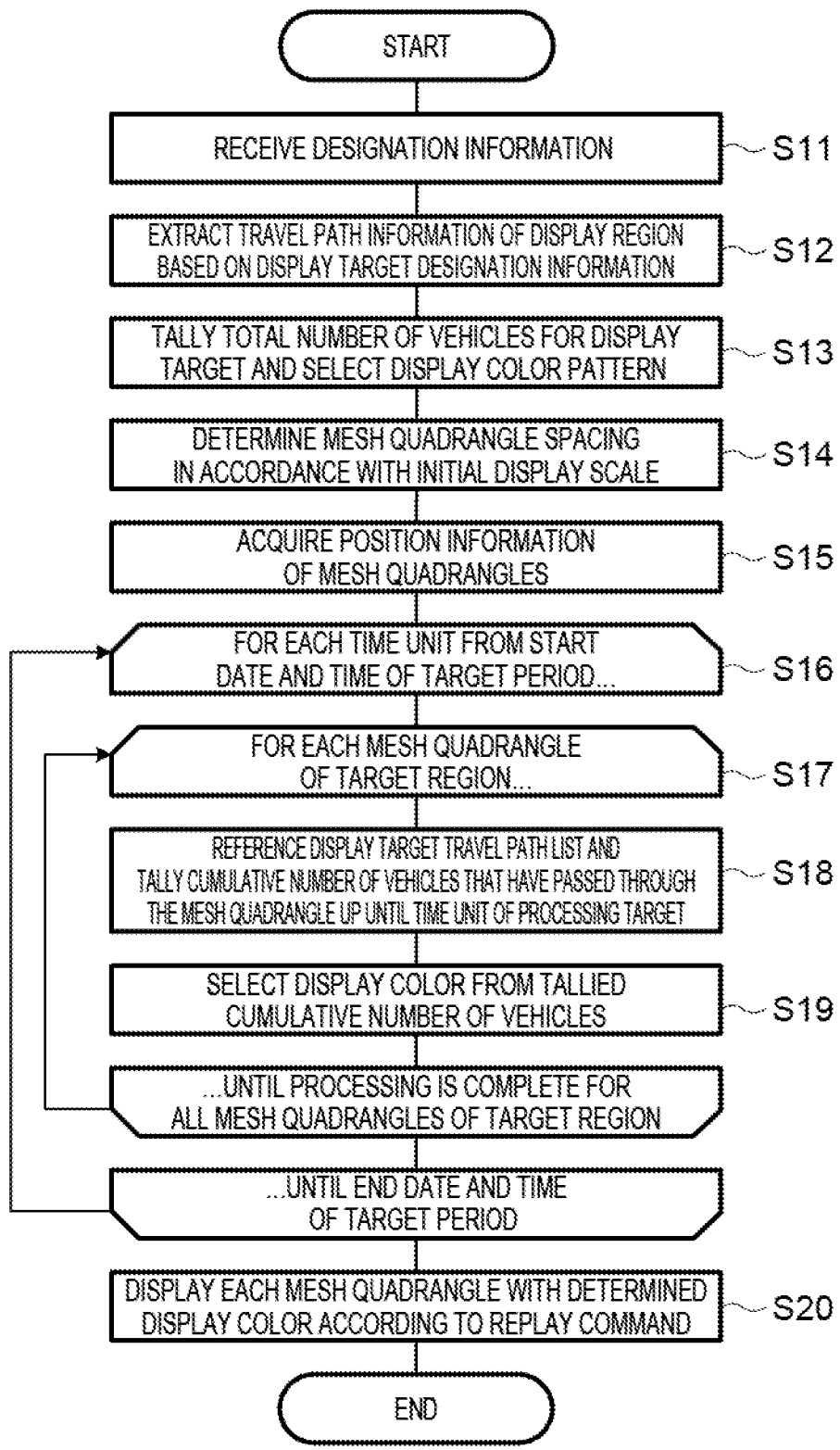
FIG. 11 is a flowchart illustrating an example of travel path analysis support processing.

Next, explanation follows regarding operation of the travel path analysis support device 10 according to the present exemplary embodiment. Plural items of travel path information obtained by processing positioning information acquired from plural vehicles are stored in the travel path DB 31. In this state, when the designation information 21 is input to the travel path analysis support device 10, the travel path analysis support processing illustrated in FIG. 11 is executed in the travel path analysis support device 10. Note that the travel path analysis support processing executed in the travel path analysis support device 10 is an example of the travel path analysis support method of technology disclosed herein.

At step S11 of the travel path analysis support processing illustrated in FIG. 11, the receiver 11 receives the designation information 21 input to the travel path analysis support device 10, and stores the received designation information 21 in the specific storage region.

Next, at step S12, the extraction section 12 reads the travel path DB 31 from the external storage device. Then, the extraction section 12 references the designation information 21, and extracts the travel path information corresponding to the target region and target period designated by the designation information 21, from out of the travel path information stored in the travel path DB 31. The extraction section 12 then registers the extracted travel path information in the display target travel path list 22.

Next, at step S13, the selection section 13 counts the vehicle IDs of the items of travel path information included in the display target travel path list 22, and counts the total number of vehicles that have entered the target region in the target period. The selection section 13 then references the color coding determination table 24, and selects the display color pattern based on the total number of vehicles counted.

Next, in accordance with a predetermined initial display scale (for example, the first display scale in the selection order), at step S13 the selection section 13 references the display spacing determination table 23, and determines the spacing of the mesh quadrangles 71 that corresponds to the display scale.

Next, at step S14, the mesh quadrangle spacing is determined in accordance with the initial display scale. Next, at step S15, the selection section 13 partitions the target region into plural mesh quadrangles 71 based on the spacing determined at step S14 above. The selection section 13 then acquires, for example, latitudes and longitudes indicating the positions of the upper left corners of the mesh quadrangles 71 as the position information of each of the mesh quadrangles 71.

Next, by the loop processing of step S16, the selection section 13 sets each of the time units of from the start date and time until the end date and time of the target period as a processing target, one by one, and executes the loop processing of step S17. In the loop processing of step S17, the selection section 13 respectively sets all of the mesh quadrangles 71 in the target region as the processing target, one by one, and executes the processing of the following steps S18 and S19.

At step S18, the selection section 13 specifies the range indicated by the mesh quadrangle 71 that is the processing target based on the position information and the display spacing of the mesh quadrangle 71 that is the processing target. The selection section 13 then tallies the cumulative number of vehicles represented by the total number of vehicles that have passed through the range indicated by each of the mesh quadrangles 71, in each time unit of from the start date and time of the target period until the processing target time unit.

Next, at step S19, the selection section 13 selects the display color that corresponds to the display pattern selected at step S13 above and the cumulative number of vehicles tallied at step S19 above in the processing target time unit, for the mesh quadrangle 71 that is the processing target.

When the loop processing of step S17 has completely finished, and when the loop processing of step S16 has also finished, processing transitions to step S20.

At step S20, the display controller 14 performs control such that a display screen 80 like that illustrated in FIG. 9 is displayed on the display device. The display controller 14 also specifies the target time unit to be displayed on the animation playback region 81 according to the operation of the playback command bar 84. The display controller 14 then displays each of the mesh quadrangles 71 with the display color stored in association with the specified time unit. The display controller 14 implements the animation display by changing the display color of each of the mesh quadrangles 71 each time the target time unit to be displayed changes.

Figure 12:
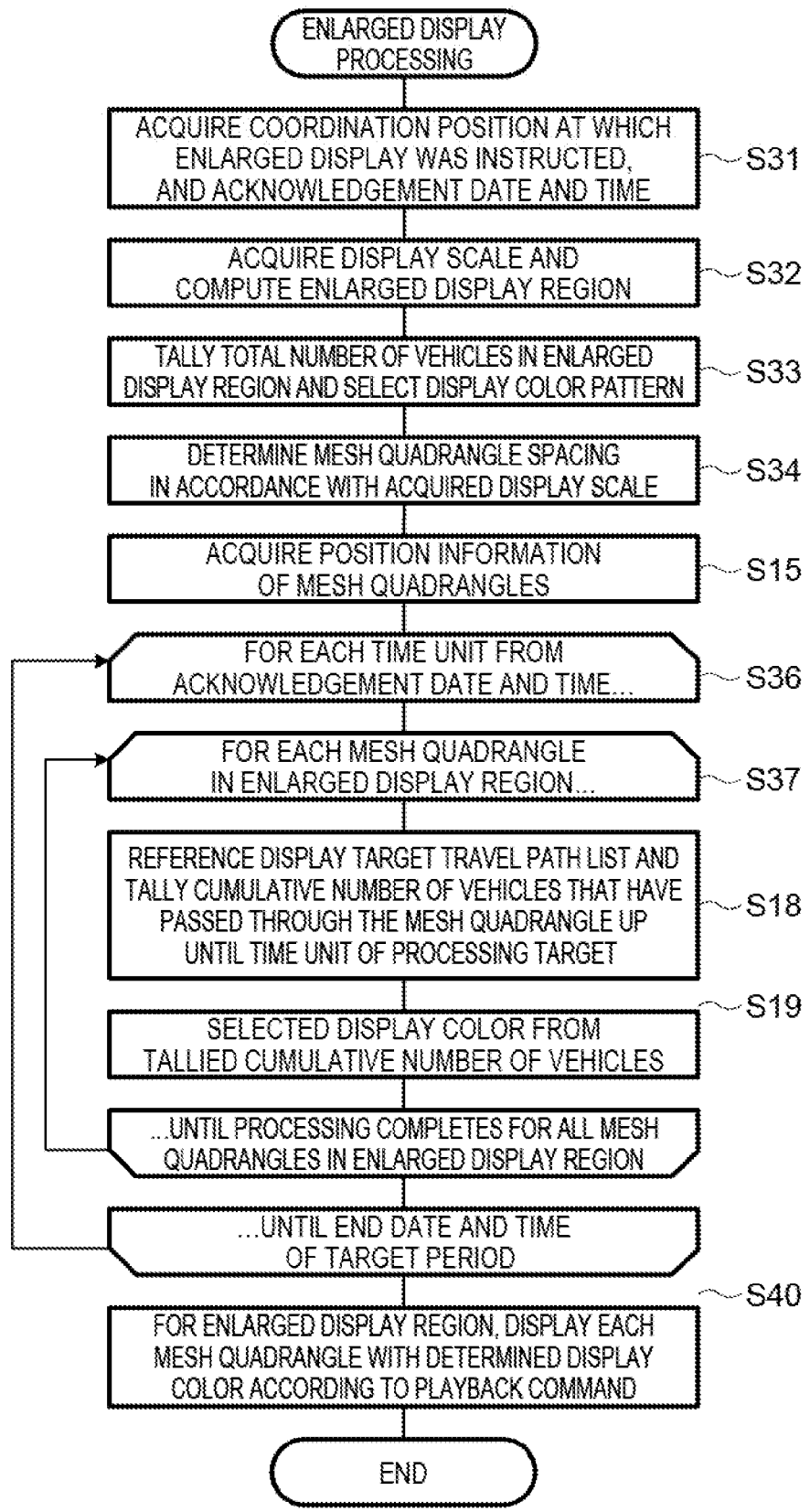
FIG. 12 is a flowchart illustrating an example of enlarged display processing.

At step S20 above, when, at a timing at which the animation display is in progress, an instruction for enlarged display is input to the travel path analysis support device 10 from the user, the enlarged display processing illustrated in FIG. 12 is executed in the travel path analysis support device 10. In the enlarged display processing illustrated in FIG. 12, the same reference numerals are allocated to steps that perform similar processing to those of the travel path analysis support processing illustrated in FIG. 11, and detailed explanation regarding those step is omitted.

At step S31 of the enlarged display processing illustrated in FIG. 12, the receiver 11 acquires the coordinate position at which enlargement was instructed, and the acknowledgement date and time, based on an operation from the user indicating an instruction for enlarged display (for example, a double click). The receiver 11 notifies the selection section 13 of the instruction for enlarged display together with the coordinate position and the acknowledgement date and time.

Next, at step S32, the selection section 13 references the display spacing determination table 23, and acquires the next display scale after the current display scale in the selection order. The selection section 13 then computes the enlarged display region based on the acquired display scale, and the latitude and longitude corresponding to the coordinate position notified by the receiver 11 together with the enlarged display notification.

Next, at step S33, the selection section 13 counts the total number of vehicles that have entered the enlarged display region from the acknowledgement date and time acquired from the receiver 11 together with the enlarged display notification until the end date and time of the target period. The selection section 13 then references the color coding determination table 24, and selects the display color pattern when each of the mesh quadrangles 71 are displayed with color coding, based on the total number of vehicles counted.

Next, at step S34, the selection section 13 references the display spacing determination table 23, and determines the display spacing of the mesh quadrangles 71 based on the display scale acquired at step S32 above. Next, at step S15, the selection section 13 acquires the position information of each of the mesh quadrangles 71.

Next, in the loop processing of step S36, the selection section 13 sets each of the time units from the acknowledgement date and time until the end date and time as the processing target, one by one, and executes the loop processing of step S37. In the loop processing of step S37, the selection section 13 respectively sets all of the mesh quadrangles 71 in the enlarged display region as the processing target, one by one, and executes similar processing to the processing of steps S18 and S19 of FIG. 10.

When the loop processing of step S37 has completely finished, and the loop processing of step S36 has also finished, processing transitions to step S40.

At step S40, the selection section 13 notifies the display controller 14 of the latitude and longitude for specifying the enlarged display region, and information indicating the display scale after enlargement. The display controller 14 then performs animation display after enlargement, based on the information notified by the selection section 13, and the display color of each of the mesh quadrangles 71 stored in the specific storage region by the selection section 13.

As explained above, the travel path analysis support device according to the present exemplary embodiment performs color coded display of each of the mesh quadrangles obtained by dividing the specific region by the specific size, according to the cumulative number of vehicles that have passed through the range indicated by that mesh quadrangles up until each time unit. Time-wise changes in the cumulative members of vehicles are represented in an animation by causing the color coded display corresponding to the cumulative numbers of vehicles to change moment to moment with each time unit. The granularity of the color coding corresponding to the cumulative number of vehicles is selected according to the total number of vehicles that have entered into the target region in the target period. When enlarged display has been instructed during animation playback, the spacing of the mesh quadrangles is changed according to the display scale, and the granularity of the color coding is changed according to the total number of vehicles that have entered the enlarged display region since the timing at which enlarged display was instructed. Namely after enlarged display, time-wise changes in the cumulative numbers of vehicles are displayed by an animation for each of the mesh quadrangles corresponding to the enlarged display region, and time-wise changes in the cumulative numbers of vehicles after enlarged display can be represented appropriately.

Figure 13:
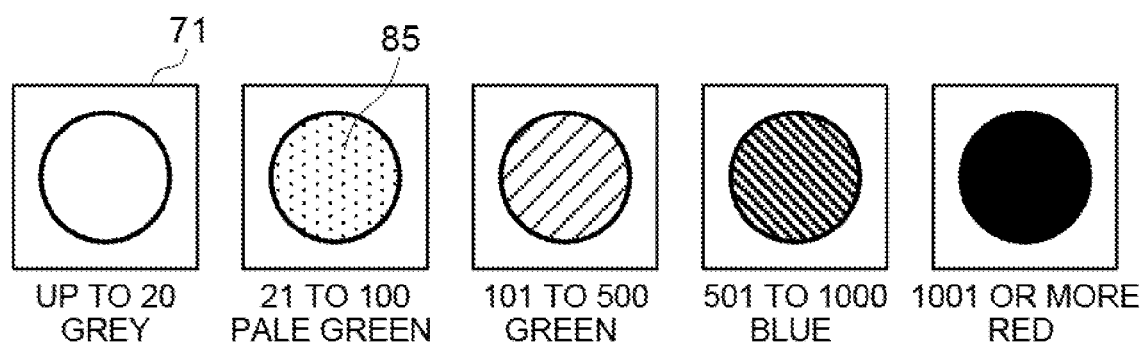
FIG. 13 is a diagram for explaining another example of mesh square color coding.

Although explanation has been given regarding a case in which entire mesh quadrangles are displayed with the selected display color in the present exemplary embodiment, there is no limitation thereto. For example, as illustrated in FIG. 13, marks (for example, a dot 85) may be corresponded with the mesh quadrangles 71 on a one-to-one basis, and the mark corresponding to a respective mesh quadrangle 71 may be displayed with the display color corresponding to the cumulative number of vehicles that have passed through that range indicated by that mesh quadrangle 71 up until the given time unit. In cases in which marks corresponded with the mesh quadrangles 71 are employed, the sizes of the marks, and the types of marks, may be changed according to the cumulative numbers of vehicles.

Figure 14:
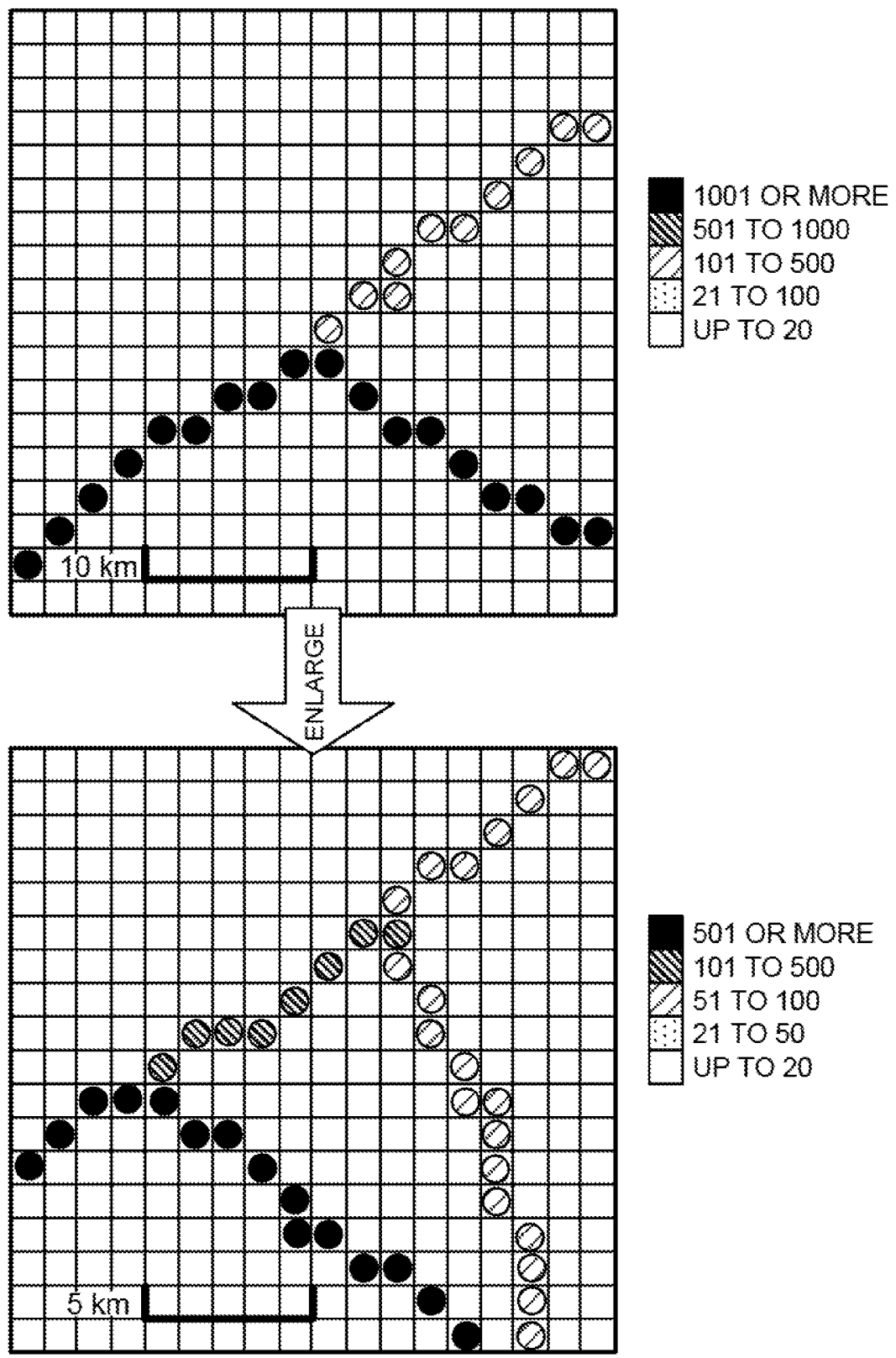
FIG. 14 is a diagram for explaining a case in which a display color pattern is changed after enlargement.
Figure 15:
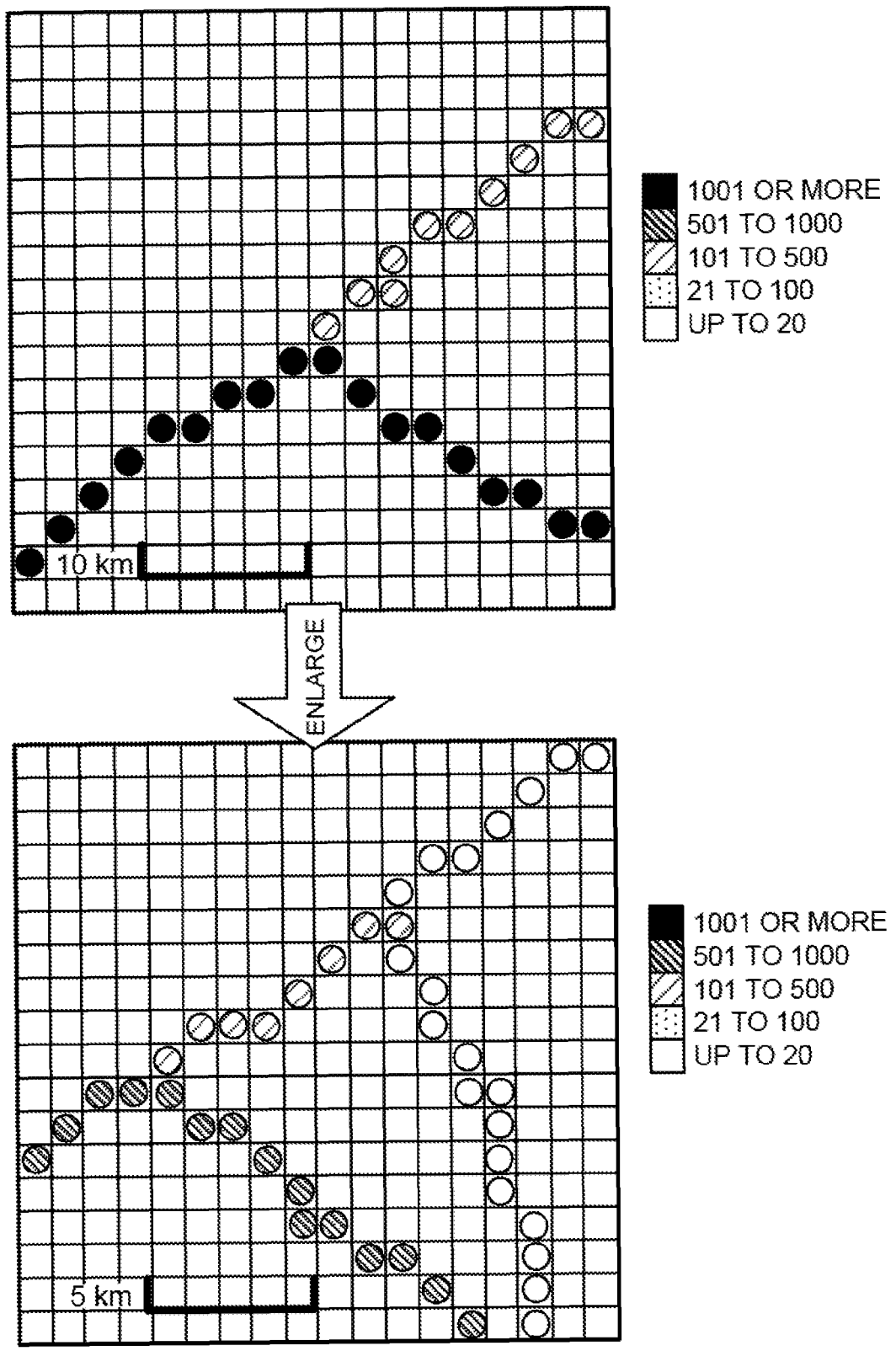
FIG. 15 is a diagram for explaining a case in which a display color pattern from before enlargement persists after enlargement.

Moreover, in the present exemplary embodiment described above, in the enlarged display, the color coding determination table 24 is referenced and the display color pattern is reselected according to the total number of vehicles that have entered the enlarged display region since the timing at which enlarged display was instructed. Accordingly, as illustrated in FIG. 14, relative variation in the cumulative numbers of vehicles can be represented with color coding similarly to before enlargement. Alternatively, as illustrated in FIG. 15, the display pattern from before enlargement may persist as-is even after enlarged display. Since the range indicated by the mesh quadrangles 71 is narrower after enlarged display, the cumulative number of vehicles corresponding to each of the mesh quadrangles 71 is expected to be less than before enlargement. In cases in which the display pattern from before enlargement persists after enlarged display, the display color of each of the mesh quadrangles 71 will, overall, change to a display color representing a lower cumulative number of vehicles than before enlargement. In such cases, a representation is possible in which cumulative numbers of vehicles are persistently displayed color coded according to the same absolute number as before enlargement. Note that FIG. 14 and FIG. 15 are for explanation of whether the display color pattern changes or persists after enlarged display, and they do not represent an exact enlarged display for a case in which a display at a scale of 10 km in the upper portions of FIG. 14 and FIG. 15 is enlarged to a display at a scale of 5 km in the lower portions of FIG. 14 and FIG. 15.

Moreover, whether the display color pattern changes or persists after enlarged display may be made selectable. For example, in cases in which enlarged display is performed with a change from the display color pattern from before enlargement, switching may be instructed by, for example, pressing a display switching button, not illustrated in the drawings. In such cases, it is sufficient to reselect the display color pattern from before enlargement, and set the display color of each of the mesh quadrangles 71 to a display color corresponding to the reselected display color pattern. Suppose switching was instructed in a case in which enlarged display is being performed with the display color pattern from before enlargement persisting. In such a case, it is sufficient to reselect the display color pattern according to the total number of vehicles that have entered the enlarged display region since the acknowledgement date and time, and set the display color of each of the mesh quadrangles 71 to a display color corresponding to the reselected display color pattern. This enables relative representations and absolute representations of time-wise changes in traffic conditions before and after enlarged display to be switched by a simple operation.

Although explanation has been given regarding a case in which time-wise changes in traffic conditions are time-wise changes in the cumulative numbers of vehicles that have passed through the range indicated by the mesh quadrangles in the present exemplary embodiment described above, there is no limitation thereto. For example, time-wise changes in the number of vehicles that have passed through the range indicated by the mesh quadrangles per time unit may be employed. In such cases, a color coding determination table determines plural display color patterns having granularities of cumulative numbers of vehicles per time unit, serving as standards for switching the display color, that vary depending on the total number of vehicles that have entered in the target region in the target period. When the display colors of the mesh quadrangles are selected, it is sufficient to tally the number of vehicles that have passed through the range indicated by the mesh quadrangles per time unit, and select the display colors corresponding to the number of vehicles per time unit by referencing the color coding determination table.

Cases in which the traffic condition is the number of vehicles per time unit are suitable for understanding changes in a vehicle movement condition or an amount of traffic flow per time unit. Moreover, in cases in which the traffic condition is the cumulative number of vehicles are suitable for understanding information such as that indicating the extent to which roads are utilized over time.

Although explanation has been given regarding a case in which display is enlarged midway through animation display in the present exemplary embodiment, technology disclosed herein can be similarly applied to cases of reduced display. In cases in which reduced display has been instructed, for example, the display scale is selected in the reverse order of the "selection order" of the display spacing determination table 23 illustrated in FIG. 5. For example, in cases in which the current display scale is 1 km, the display scale may be changed to 2 km after instruction for reduced display. The processing after determination of the display scale is similar to in cases of enlarged display.

Although explanation has been given regarding a mode in which the travel path analysis support program 50 is pre-stored (installed) on the storage section 43, there is no limitation thereto. Programs according to technology disclosed herein may be provided in a mode stored on a recording medium such as a CD-ROM, DVD-ROM, or USB memory.

Sometimes, in addition to understanding what the traffic condition is at a given time, there is also a desire to visually understand time-wise changes in the traffic condition. It is conceivable that time-wise changes in the traffic condition could be represented by moment-to-moment display of the traffic condition per specific time as time elapses. However, in cases in which enlargement or reduction of the display is performed midway through display representing time-wise changes in the traffic condition, simply enlarging or reducing the display sometimes does not appropriately represent time-wise changes in the traffic condition after enlargement or reduction.

An aspect of technology disclosed herein enables time-wise changes in a traffic condition to be appropriately represented after enlargement or reduction in cases in which enlarged or reduced display is performed during display representing time-wise changes in the traffic condition.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory recording medium storing a travel path analysis support program that causes a computer to execute a process, the process comprising:
receiving a designation of a geographic region and a time range;
selecting a first display color control from a plurality of display color controls, according to a total number of vehicles that have entered the geographic region within the time range;
performing, in accordance with the selected first display color control, change control of display colors of respective regions, which are obtained by mesh-dividing within the geographic region, according to a time-wise change in a number of vehicles that pass through the respective regions;
when an instruction for enlarged or reduced display of a partial region inside the geographic region is received at a given timing of a procedure by which the display colors of the respective regions are changed by the change control, displaying the partial region enlarged or reduced, and selecting a second display color control from the plurality of display color controls based on a total number of vehicles that have entered the partial region within the time range after and including the given timing; and
performing, in accordance with the selected second display color control, change control of the display colors of respective regions included in the partial region, according to a time-wise change in the number of vehicles passing through the respective regions.

2. The non-transitory recording medium of claim 1, wherein, in the process:
the change control of the display colors at the time of enlarged or reduced display is selectable as either a change control of display color performed according to the first display color control, or a change control of display color performed according to the second display color control; and
the change control of the display colors of the respective regions included in the partial region according to a time-wise change in the number of vehicles passing through the respective regions is performed in accordance with the selected first display color control or the selected second display color control.

3. The non-transitory recording medium of claim 1, the process further comprising:
changing, according to an enlargement ratio of an enlarged display or a reduction ratio of a reduced display, a display spacing of the respective regions obtained by mesh-dividing within the geographic region.

4. A travel path analysis support device, comprising:
a processor configured to execute a process, the process comprising:
receiving a designation of a geographic region and a time range;
selecting a first display color control from a plurality of display color controls according to a total number of vehicles that have entered the geographic region within the time range;
performing, in accordance with the selected first display color control, change control of display colors of respective regions, which are obtained by mesh-dividing within the geographic region, according to a time-wise change in a number of vehicles that pass through the respective regions;
when an instruction for enlarged or reduced display of a partial region inside the geographic region is received at a given timing of a procedure by which the display colors of the respective regions are changed by the change control, displaying the partial region enlarged or reduced, and selecting a second display color control from the plurality of display color controls based on a total number of vehicles that have entered the partial region within the time range after and including the given timing; and
performing, in accordance with the selected second display color control, change control of the display colors of respective regions included in the partial region according to a time-wise change in the number of vehicles passing through the respective regions.

5. The travel path analysis support device of claim 4, wherein, in the process:
the change control of the display colors at the time of enlarged or reduced display is selectable as either change control of display color performed according to the first display color control, or change control of display color performed according to the second display color control; and the change control of the display colors of the respective regions included in the partial region according to a time-wise change in the number of vehicles passing through the respective regions is performed in accordance with the selected first display color control or the selected second display color control.

6. The travel path analysis support device of claim 4, the process further comprising:

changing, according to an enlargement ratio of an enlarged display or a reduction ratio of a reduced display, a display spacing of the respective regions obtained by mesh-dividing within the geographic region.

7. A travel path analysis support method, comprising:

receiving a designation of a geographic region and a time range;

selecting a first display color control from a plurality of display color controls according to a total number of vehicles that have entered the geographic region within the time range;

performing, in accordance with the selected first display color control, change control of display colors of respective regions, which are obtained by mesh-dividing within the geographic region, according to a time-wise change in a number of vehicles that pass through the respective regions;

by a processor, when an instruction for enlarged or reduced display of a partial region inside the geographic region is received at a given timing of a procedure by which the display colors of the respective regions are changed by the change control, displaying the partial region enlarged or reduced, and selecting a second display color control from the plurality of display color controls based on a total number of vehicles that have entered the partial region within the time range after and including the given timing; and performing, in accordance with the selected second display color control, change control of the display colors of respective regions included in the partial region, according to a time-wise change in the number of vehicles passing through the respective regions.

8. The travel path analysis support method of claim 7, wherein:

the change control of the display colors at the time of enlarged or reduced display is selectable as either change control of display color performed according to the first display color control, or change control of display color performed according to the second display color control; and the change control of the display colors of the respective regions included in the partial region according to a time-wise change in the number of vehicles passing through the respective regions is performed in accordance with the selected first display color control or the selected second display color control.

9. The travel path analysis support method of claim 7, further comprising:

changing, according to an enlargement ratio of an enlarged display or a reduction ratio of a reduced display, a display spacing of the respective regions obtained by mesh-dividing within the geographic region.

* * * * *